Aug. 25, 1942. S. B. REUBEN Re. 22,165

BRIEF CASE

Original Filed May 2, 1940

Inventor
SIMON B. REUBEN
by Henry Reich
Attorney.

Reissued Aug. 25, 1942

Re. 22,165

UNITED STATES PATENT OFFICE 22,165

BRIEF CASE

Simon B. Reuben, Chicago, Ill.

Original No. 2,226,387, dated December 24, 1940, Serial No. 333,010, May 2, 1940. Application for reissue April 4, 1942, Serial No. 438,445

5 Claims. (Cl. 281—19)

The invention relates to brief cases, and more particularly to brief cases which are equipped with loose leaf binders and used as portfolios.

It is often desirable to convert a portfolio into a brief case, especially where a large number of files or books are to be carried.

It, therefore, constitutes one of the objects of the invention to provide a portfolio with a removable binder to enable conversion to an ordinary brief case.

A further object aims at providing a removable binder with the securing means permanently attached to the binder.

A still further object aims at the provisions of a portfolio which, after the elimination of the binder, leaves the inside smooth and neat in appearance.

It is a still further object to releasably secure the binder in such manner that, upon removal of the binder from the portfolio, only two small holes are visible in the inside so that the portfolio substantially has the appearance of an ordinary brief case. No holes are visible on the outside thereof.

Figure 1:
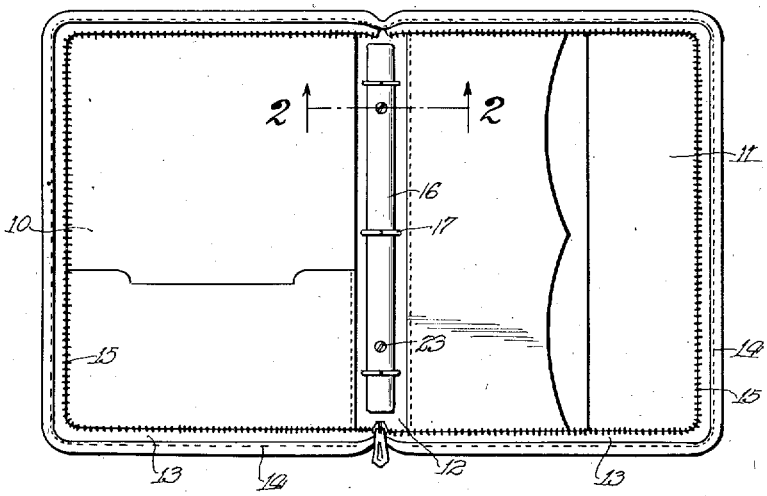
Figure 3:
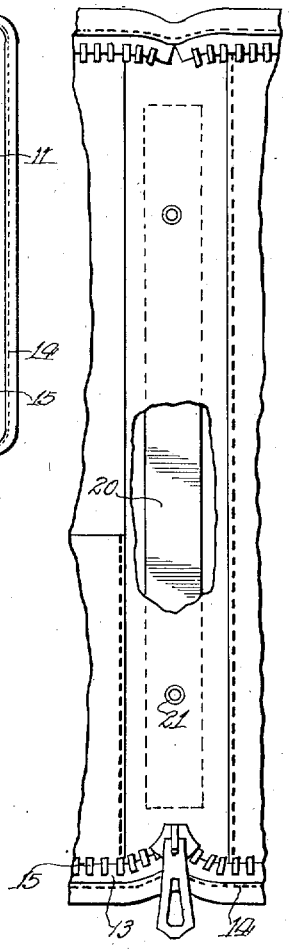
Figure 2:
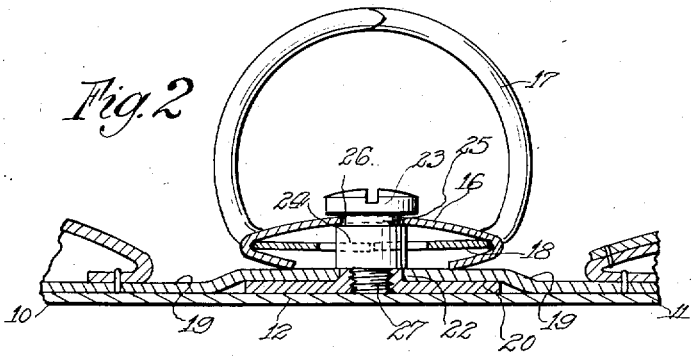
Figure 4:
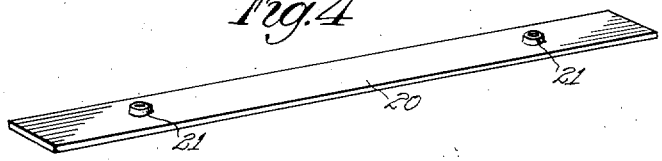

With these and other important objects in view, the invention comprises the means described in the following specification, particularly pointed out in the claims forming a part thereof, and illustrated in the accompanying drawing, in which:

Fig. 1 is a top plan view of an opened portfolio constructed in accordance with my invention, Fig. 2 is an enlarged section on the line 2—2 of Fig. 1, Fig. 3 is a fragmentary top plan view of the back of the portfolio with the binding mechanism removed, and Fig. 4 is a perspective view of a retaining bar to which the binding mechanism is secured.

Referring to the several views in the drawing, the portfolio comprises a front cover 10 and a rear cover 11 connected by an integral back 12.

As is well known, the edges of the cover are folded over and a strip of cloth 13 is secured by a seam 14 thereto. A slide fastener 15 is secured to the inner edge of the strip 13 and is actuated by a handle, 15[1] when the covers are brought together to close the portfolio.

The binder mechanism which per se does not form a part of the invention, includes a casing 16, sectionalized rings 17 and a bar 18 in the casing. The covers and back have an inner lining 19.

Between the lining 19 and the back a longitudinal bar 20 is interposed, which has bosses 21. The bosses are provided with threaded bores. The bosses extend through apertures 22 in the lining.

As shown in Fig. 2, a screw 23, or other secured means, is permanently attached to the binding mechanism by having its shank 24 provided with a circumferential groove 25 into which the edge of an aperture 26 extends. The lower reduced end 27 is threaded and is adapted to be screwed home into the bosses.

It is obvious that the binding mechanism may be removed by loosening the screws 23 and, after such removal, nothing is visible but the upper end of the bosses 21, so that a neat appearance is afforded on the inside of the portfolio even though the binding mechanism is removed.

While the drawing shows one embodiment of the invention, various changes and alterations may be made without departing from the spirit of the invention. All such changes and alterations are included, which constitute departures within the scope of the invention, as defined in the appended claims.

I claim:

1. In a portfolio having a back, a binding mechanism, apertured bosses in the back of the portfolio and terminating flush therewith, and screws permanently attached to said binding mechanism and adapted to enter said bosses.

2. In a portfolio having a back, a bar concealed within the back of the portfolio and provided with one or more bosses substantially flush with the top surface of the back, a binding mechanism, and screws removably securing said binding mechanism to said bosses.

3. In a portfolio having a back, a bar concealed within the back of the portfolio and provided with fastening means substantially flush with the top surface of the back, a binding mechanism, and securing means permanently attached to said binding mechanism and adapted to cooperate with said fastening means to releasably secure said binding mechanism to said back.

4. In a portfolio having a back, a binding mechanism, apertured bosses in the back of the portfolio and terminating flush therewith and securing means permanently attached to said binding mechanism and cooperating with the walls of said bosses to releasably secure said binding mechanism to said back.

5. In a portfolio having a back, a binding mechanism, fastening means in the back of the portfolio and terminating flush with the top surface of the back, a reinforcement in said back for said fastening means, and securing means permanently attached to said binding mechanism and adapted to cooperate with said fastening means to releasably secure said binding mechanism to said back.

SIMON B. REUBEN.